(12) United States Patent        (10) Patent No.:     US 8,344,280 B2
Schneider et al.                 (45) Date of Patent:      Jan. 1, 2013

(54) FRONT LOADING STUD WELDING HEAD

(75) Inventors: Michael Schneider, Lahnau-Atzbach (DE); Karl Heinz Briehl, Rossberg (DE); Alexander Schug, Staufenberg (DE); Jochen Hain, Eschenburg (DE)

(73) Assignee: Newfrey LLC, Newark, DE (US)

( * ) Notice: Subject to any disclaimer, the term of this patent is extended or adjusted under 35 U.S.C. 154(b) by 321 days.

(21) Appl. No.: 12/769,921

(22) Filed: Apr. 29, 2010

(65) Prior Publication Data

US 2010/0276400 A1    Nov. 4, 2010

(30) Foreign Application Priority Data

Apr. 29, 2009  (DE) .......................... 10 2009 019 130

(51) Int. Cl.
    *B23K 9/20*    (2006.01)
(52) U.S. Cl. ............. 219/98; 219/99; 29/429; 29/407.1; 29/714
(58) Field of Classification Search .............. 219/98–99; 29/429, 407.1, 714
    See application file for complete search history.

(56) References Cited

U.S. PATENT DOCUMENTS

| 5,384,445 A | 1/1995 | Nakagami |
| 2004/0245221 A1* | 12/2004 | Schmitt et al. .................. 219/98 |
| 2007/0067975 A1 | 3/2007 | Gerhardt et al. |

FOREIGN PATENT DOCUMENTS

| DE | 102005044367 A1 | 3/2007 |
| EP | 1495828 B1 | 5/2006 |

* cited by examiner

*Primary Examiner* — Minchul Yang
(74) *Attorney, Agent, or Firm* — Michael P. Leary

(57) ABSTRACT

The invention relates to a joining head arrangement for joining components, such as studs, onto a workpiece. The joining head arrangement comprises a housing and a slide that is mounted on the housing and is movable, by means of a linear drive, in a joining direction in relation to the housing. The joining head further comprises a component holder, arranged on the slide, and operable to hold a component during a joining operation. A feed device delivers components, at a transfer location, to the component holder. The component holder is rotatable about an axis, which is aligned transversely relative to the joining direction, from a transfer position to a joining position.

17 Claims, 2 Drawing Sheets

FRONT LOADING STUD WELDING HEAD

CROSS-REFERENCE TO RELATED APPLICATIONS

This application claims priority from German Patent Application No. 10 2009 019 130.5, filed on Apr. 29, 2009, the disclosure of which is incorporated herein by reference.

BACKGROUND OF THE INVENTION

The present invention relates to a joining head arrangement for joining components, such as studs, onto workpieces, such as metal sheets, comprising a housing and a slide that is mounted on the housing and is movable in a joining direction in relation to the housing by means of a linear drive, comprising at least one component holder, which is arranged on the slide and at which a component can be held during a joining operation, and comprising at least one feed device for feeding components, a component being transferred, at a transfer location, from the feed device to the component holder.

Further, the present invention relates to a method for feeding a component to a component holder and for joining the component onto a workpiece in a joining direction.

A joining head arrangement of the type described above is known, for example, from the document EP 1 495 828 B1.

In the present context, the term joining is intended to refer to all types of connection of elements, such as fastening elements, on workpieces, such as metal sheets, including adhesive bonding, forming, such as, for example, riveting, or combining of materials, such as, for example, welding. In particular, the term joining is intended here to relate to the joining of rotationally symmetrical components, such as studs, onto workpieces that are to be connected to the respective workpiece by, for example, short-time arc welding (stud welding) and/or by thermoplastic connection methods such as thermoplastic bonding or thermoplastic welding.

The components can be studs that have a shank and a head, or flange portion, having a somewhat greater diameter than the shank.

In the domain of stud welding, i.e. welding of metallic studs onto metal sheets, there is known the practice of feeding the studs to a joining head arrangement in an automated manner by means of a feed device.

In the case of the joining head arrangement known from the above-mentioned document EP 1 495 828 B1, the feeding of singled studs to the joining head arrangement is effected by compressed air. The stud holder is realized as a collet, which can be widened to a diameter of at least the flange diameter. The studs are fed into the holding device from behind, with the flange portion foremost, until the flange portion has emerged axially from the collet and the collet continues to hold only the shank of the stud. Starting from this position, a stud welding operation can then be performed, which operation can comprise, for example, the stages of placing the flange portion onto the workpiece, passing a pilot current through the stud and the workpiece, then raising the stud from the workpiece in order to draw an arc, switching over to a welding current, such that the mutually opposite surfaces of flange portion and workpiece become fused, and, finally, lowering the stud back onto the workpiece, until the arc is extinguished. At approximately the same time, the welding current is switched off, such that the combined melt solidifies and the stud is connected to the workpiece by material bonding.

Problematic in the case of the above joining head arrangement is that the component holder is subject to a large amount of wear. This is due to the elastic clamping elements of the component holder becoming overstretched by the relatively large cross-section of the flange portion.

A further joining head arrangement is known from the document DE 10 2005 044367 A1 (corresponds to publication US2007/0067975), which is under common ownership with this application and the disclosure of which is incorporated herein by reference. In the case of this arrangement, a housing, on which a slide is mounted in a linearly moveable manner, is rotatably mounted on an elongate arm. The feed device is fixed to the arm, and terminates in a transfer station. The housing can be so turned in relation to the arm that a stud, made available at the transfer station, is received there, in order subsequently to perform a joining operation with the received stud and following turning back to a joining position. In the case of this joining head arrangement, the cycle times are relatively long. In addition, the component holder is of relatively complex design, to enable the studs made available at the transfer station to be received in a reliable manner.

BRIEF SUMMARY OF THE INVENTION

Against the above background, it is the object of the invention to specify a joining head arrangement and a joining method, by means of which arrangement and method relatively short cycle times can be achieved and wherein the component holder can be of a simple structure.

The above object is achieved, in the case of the joining head arrangement mentioned at the outset, in that the component holder is rotatable, on the slide, about an axis that is aligned transversely relative to the joining direction, in such a way that the component holder can be turned between the transfer location and a joining position.

Further, the above object is achieved by a method for feeding a component to a component holder and for joining the component onto a workpiece in a joining direction, comprising the steps:

turning the component holder, on a slide, to a transfer position in which the component holder is aligned with a feed channel, wherein the component holder is turned about an axis that is aligned transversely relative to the joining direction;

feeding the component, through the feed channel, into the component holder;

turning the component holder to a joining position; and performing a joining operation, the slide being moved in the joining direction.

In the case of this joining head arrangement, or this joining method, it is particularly advantageous that high, i.e. short cycle times, can be achieved, depending on the embodiment. Further, the component holder can be of a structurally simple design. This applies, in particular, when studs having a flange portion are to be joined. These studs, at the transfer location, can be transferred with the shank foremost into the component holder, such that overstretching of the stud holder can be prevented. The service life of the component holder can thereby be prolonged substantially.

The object is thus achieved in full.

It is particularly advantageous if the transfer location is fixed in relation to the housing or the slide. Fixing to the housing is particularly preferred in this case, since the feed device need not therefore be moved concomitantly in the region of the transfer location.

According to a further preferred embodiment, a shaft is rotatably mounted on the slide, on which shaft the component holder is so fixed that a component held thereon is aligned transversely relative to the shaft.

Turning of the component holder can thereby be realized in a structurally simple manner.

It is particularly advantageous in this case if there are fixed on the shaft at least two component holders that are arranged so as to be distributed over the circumference of the shaft.

In the case of this embodiment, it is advantageous that very high cycle times can be achieved, since, during a joining operation in which one of the component holders is being used, a further component to be joined can be fed to the other component holder, at the transfer location. Following completion of the joining operation, the further component can then be joined by turning the shaft. The first-mentioned component holder is then located at the transfer location, and can receive a further component.

This parallel operation enables the cycle times to be improved significantly.

It is further of particular advantage in this case if at least two feed devices are provided, such that a component can be transferred from the respective feed device to a respective component holder at at least two transfer locations.

In the case of this embodiment, differing components (for example, of differing shank length or differing flange diameter) can be made available, on the one hand, by the feed device. It is particularly preferable if, in this case, at least three component holders are fixed to the shaft, which component holders are arranged so as to be distributed over the circumference of the shaft. In the case of this embodiment, a component can be transferred to a respective component holder at at least two transfer locations in a rotary position of the shaft, whilst a further component is held by the third component holder for the purpose of performing a joining operation therewith.

Overall, it is further advantageous if a drive device is fixed to the slide for the purpose of turning the component holder.

The turning of the component holder, for example by turning the shaft, can thereby be realized in a structurally simple manner.

It is particularly advantageous in this case if the component holder is arranged at one end of the shaft and the drive device is arranged at the other end of the shaft.

In the case of this arrangement, it is possible to achieve a situation whereby the drive unit does not constitute an additional interfering contour.

It is particularly advantageous if the drive device has an electric motor, which can be realized, for example, as a stepping motor.

It is particularly advantageous if the electric motor is arranged concentrically relative to the shaft.

An output shaft of the electric motor can thereby be directly connected to the shaft to which the at least one component holder is fixed.

In the case of the method according to the invention, it is advantageous if the feeding of the component through the feed channel into the component holder is effected in an uninterrupted manner.

In the case of this embodiment, there is no provision, for the purpose of making available the component, of a transfer station at which the component comes to a standstill and is then "collected" by the respective component holder. Rather, particularly in the case of the feed channel being aligned with the stud holder at the transfer location, a stud can be passed directly from the feed channel into the component holder, for example, by compressed air or the like, without intermediate stopping.

As a result of this measure, the component holder can be realized in a structurally simple manner, for example, as a substantially cylindrical collet, into which the shank of the stud is inserted. Such a cylindrical stud holder can be realized with at least one longitudinal slot, preferably with a plurality of longitudinal slots, in order to provide the necessary radial elasticity.

In the case of the method according to the invention, it is further advantageous, for the purpose of improving the cycle time, that, when one component holder is turned to the joining position, at least one further component holder is turned to a transfer position.

A joining operation and a feed operation can thereby be performed substantially in parallel.

It is understood that the above-mentioned features and those to be explained in the following can be applied, not only in the respectively specified combination, but also in other combinations or singly, without departure from the scope of the present invention.

BRIEF DESCRIPTION OF THE SEVERAL VIEWS OF THE DRAWINGS

Exemplary embodiments of the invention are represented in the drawing and explained more fully in the following description, wherein.

DETAILED DESCRIPTION OF THE INVENTION

Figure 1:
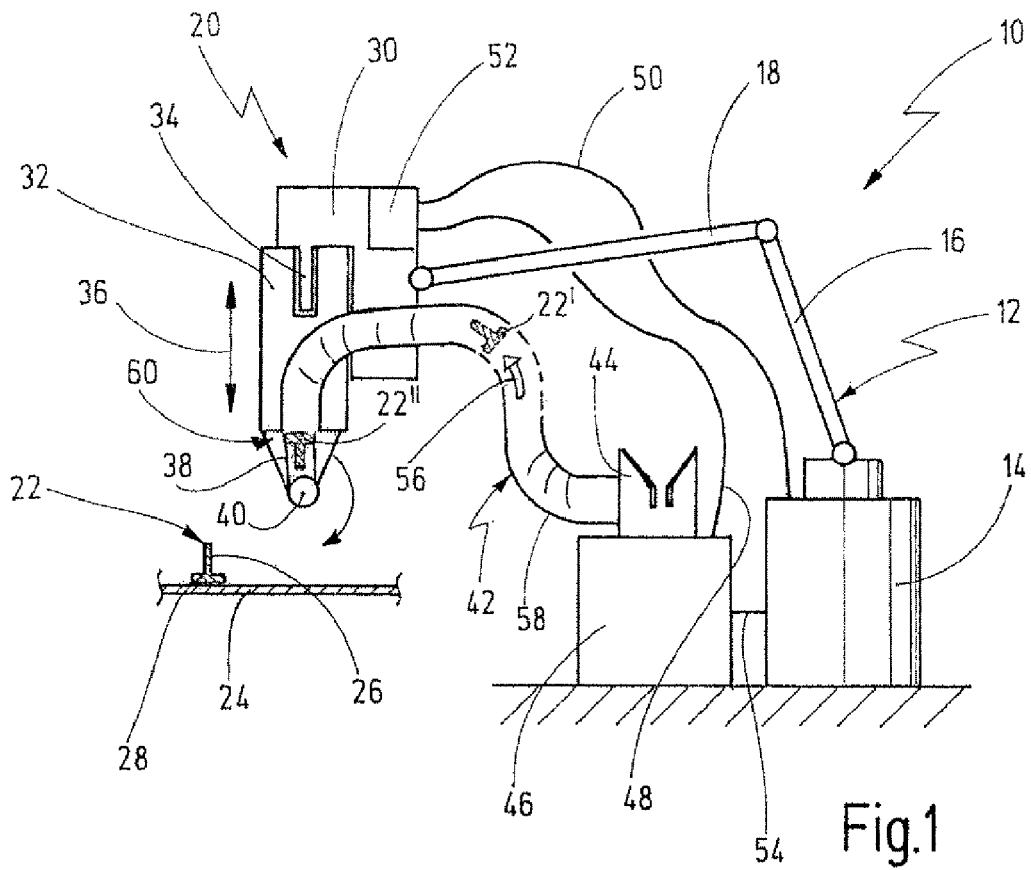
FIG. 1 shows a schematic view of a joining system comprising a joining head arrangement according to the invention.

In FIG. 1, a joining system is denoted in general by the reference 10. In the present case, the joining system 10 is designed for stud welding in the drawn arc ignition process. Alternatively, the joining system can also be designed for other joining processes, such as, for example, thermoplastic welding or adhesive bonding.

The joining system 10 comprises a robot 12 having a fixed base 14, mounted on which, in an articulated manner, is a first arm 16, at the free end of which a second arm 18 is mounted in an articulated manner.

Fixed to the free end of the second arm 18 is a joining head arrangement 20. The joining head arrangement 20, however, can also be part of a manually actuable welding gun or the like.

By means of the robot 12, the joining head arrangement 20 can be moved to various locations. Preferably, but not exclusively, such a joining system is used in motor vehicle engineering, being so used to join studs onto vehicle-body metal sheets. Studs fixed to the vehicle-body metal sheet in such manner can be used as anchors for plastic clips for fastening lines or the like, for locking in place mount-on parts, such as facings, etc.

Represented in FIG. 1 is a workpiece 24 in the form of a metal sheet, to which a component, in the form of a stud 22, has been joined by means of the joining system 10. The stud 22 comprises a shank 26 and a flange portion 28, which has a greater diameter. The stud in this case is so joined to the workpiece 24 that the shank 26 projects approximately perpendicularly relative to a surface of the work-piece, and consequently can serve as a fastening element, as an anchor or the like.

The joining head arrangement 20 comprises a housing 30, which is fixed to the free end of the second arm 18. A slide 32 is mounted in a linearly displaceable manner on the housing 30. Further provided on the housing 30 is a linear drive 34, represented schematically, by means of which the slide 32 can be moved in a linear direction (joining direction) 36 in relation to the housing 30. The linear drive can be an electric linear motor, although the linear drive 34 can also comprise a mechanical drive, such as a spring.

A component holder 38 is mounted on the slide 32 so as to be rotatable about a rotational axis 40. The rotational axis 40 is aligned transversely, in particular, perpendicularly in relation to the joining direction 36.

In FIG. 1, the component holder 38 has been turned to a transfer position in which the stud holder 38, which is aligned perpendicularly relative to the rotational axis 40, is in alignment with a feed device 42. The feed device 42 is connected to a singling device 44, in which studs 22 that are provided as bulk material are singled and then conveyed singly from the fixed singling device 44 to the joining head arrangement 20, for example by compressed air.

The joining system 10 further comprises a supply device 46, which can provide, for example, a welding voltage and control signals for operating the joining head arrangement 20. The supply device 46 is connected, via a first cable loom 48, to a control device 52 in the housing 30. Further, the control device 52 can be connected, via a second cable loom 50, to the base 14 of the robot 12. In addition, the supply device 46 and the base 14 can be connected to one another via a third cable loom 54. The welding voltage required for stud welding is provided via the first cable loom 48. Further, coordination of the movements of the robot 12 and of the slide 32 in relation to the housing 30 is effected via the cable loom 48 and via the other cable looms.

The feed device 42 comprises a feed channel 58, for example in the form of a flexible tube, through which the components 22 can be conveyed, by means of air pressure 56, to the joining head arrangement 20, as indicated by a component 22'. In the present case, the feed channel 58 is fixed to the slide 32, and terminates in the region of a transfer location 60. The transfer location 60 is so arranged that the stud holder 38 can be thereby aligned by turning about the rotational axis 40. It is thereby possible for a component to be conveyed, substantially in an uninterrupted manner, from the feed channel 58, by means of the compressed air 56, into the thereby aligned component holder 38 in a transfer position. In this case, the stud is transferred with its shank foremost into the stud holder 38, such that the clamping elements of the latter need not be widened to the diameter of the flange portion 28. The stud is then held in the stud holder 38 by a radially elastic action, as represented for a component 22" in FIG. 1.

From this position, the component holder 38 is subsequently turned to a joining position, as indicated by an arrow. The joining position can be aligned, for example, diametrically in relation to the transfer location, such that the stud holder 38 is displaced by 180° about the rotational axis 40. In the joining position, the stud is then already being held in the correct position, such that subsequently thereto the slide 32 can be displaced in relation to the housing 30, in order to place the stud onto the surface of the workpiece 24. A pilot current is then passed through the stud holder 38, the component 22 held thereon and through the workpiece 24. The stud 22 is thereafter raised back from the surface of the workpiece 24 by means of the slide 32, such that an arc is drawn. The electric current is then increased to a welding current, which can be in the region>1000 A. The mutually opposite surfaces of the component 22 and of the workpiece 24 thereby undergo fusion. By means of the linear drive 34, the slide 32 is then lowered back onto the workpiece 24, such that the melts become mixed. The welding current is switched off. The combined melt solidifies, such that the stud 22 is then materially bonded to the workpiece 24.

The slide 32 is then moved back, and the stud holder 38 is turned back to the transfer location 60, in order to receive a new stud 22'. A new joining operation, in the form of a stud welding process, is then performed.

Figure 2:
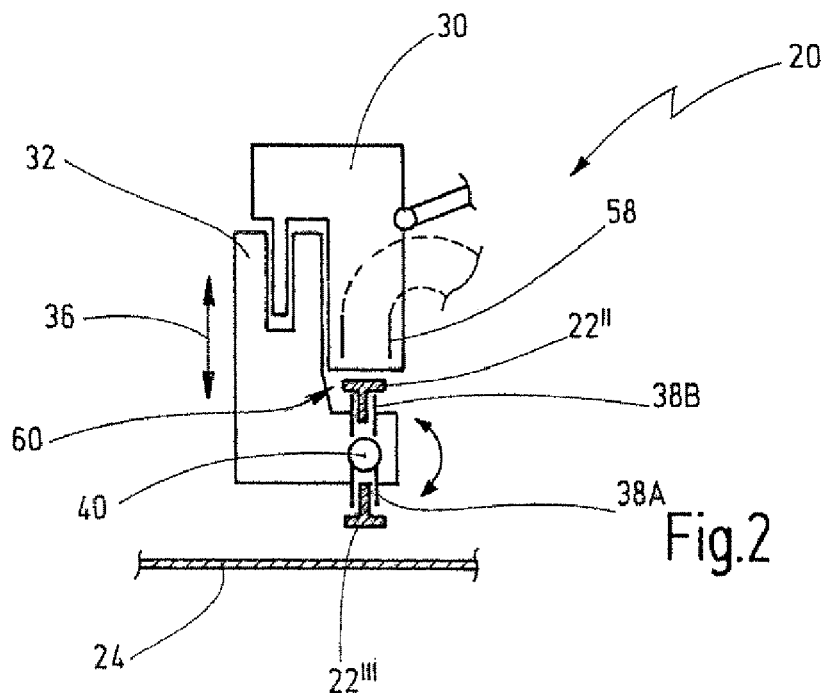
FIG. 2 shows an alternative embodiment of a joining head arrangement according to the invention.
Figure 3:
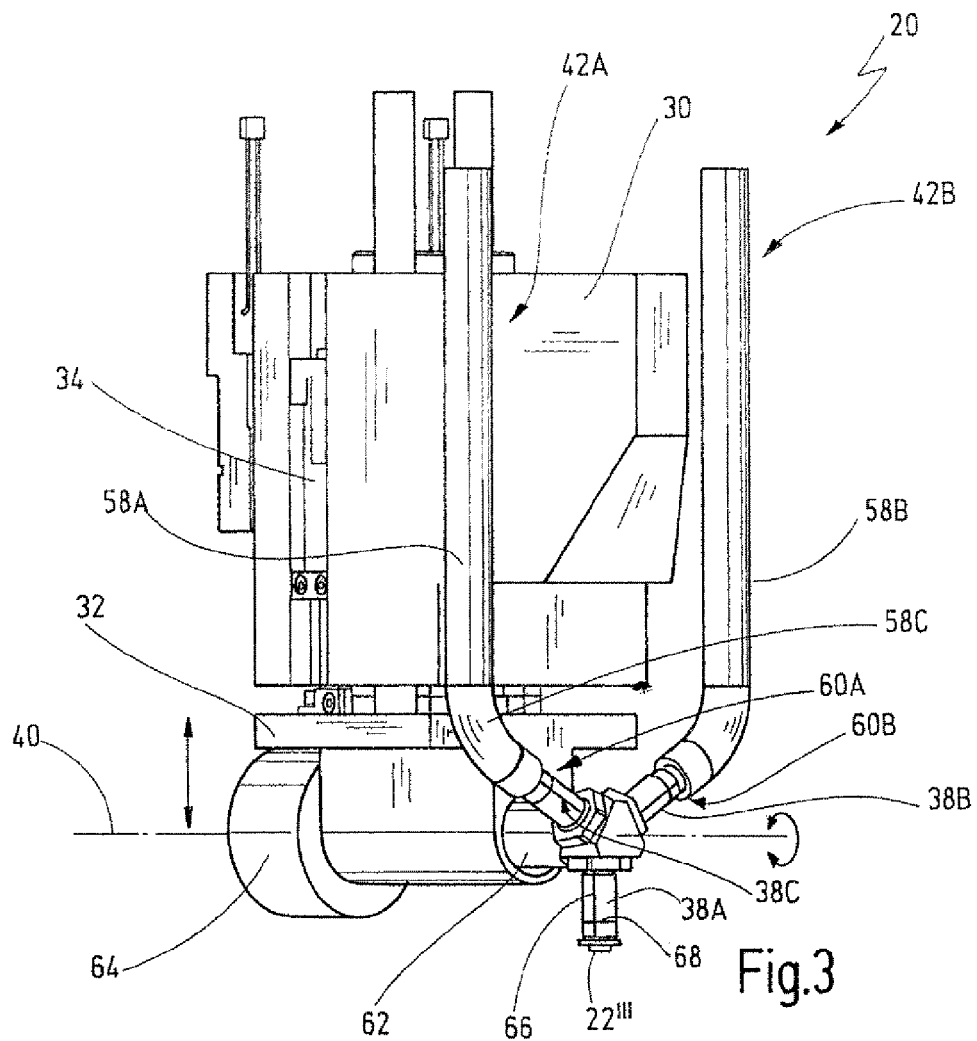
FIG. 3 shows a perspective view of a further alternative embodiment of a joining head arrangement according to the invention.
Figure 4:
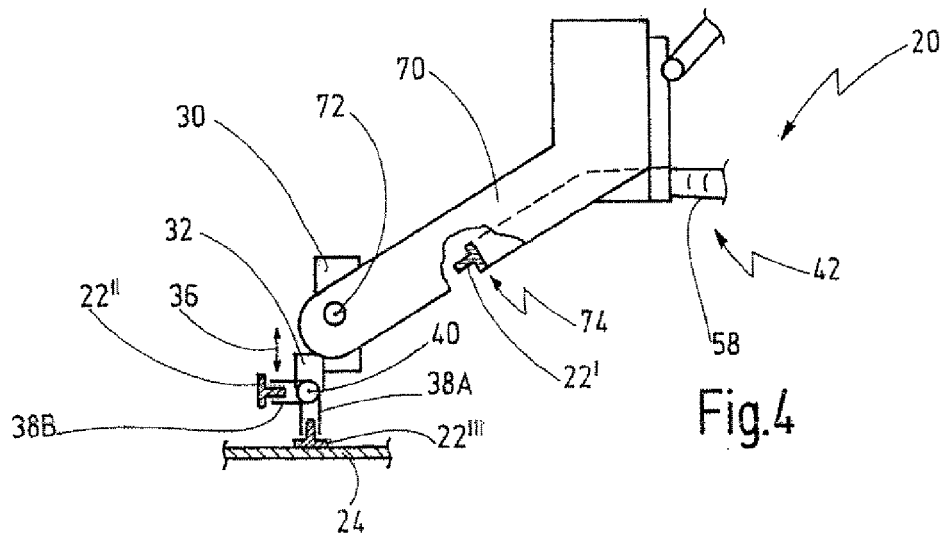
FIG. 4 shows a schematic side view of a further joining head arrangement according to the invention.

Represented in FIGS. 2 to 4 are further embodiments of joining head arrangements according to the invention, which correspond in general to the joining head arrangement 20 of FIG. 1 in respect of structure and functioning. Elements that are the same are therefore denoted by the same reference numerals. In the following, it is, in essence, the differences that are explained.

In the case of the joining head arrangement of FIG. 2, two stud component holders 38A, 38B are provided, aligned diametrically in relation to the rotational axis 40. When the one stud holder is in the transfer position at the transfer location 60, the other stud holder is in the joining position. Consequently, the feeding of a component to one of the stud holders (in FIG. 2, the stud holder 38B, to which a component 22" has been supplied) and the joining of a component 22" that is held at the other stud holder (in FIG. 2, the component holder 38A) can be performed substantially in parallel with one another.

Further, in the case of the joining head arrangement 20 of FIG. 2, the feed channel 58 is not fixed to the slide 32, but to the housing 30. It is thereby possible to achieve a situation whereby the feed channel 58 need not be moved concomitantly with movements of the slide 32. Consequently, a less wearing type of operation can be achieved.

Shown in FIG. 3 is a further joining head arrangement 20, in which a shaft 62 is mounted on the slide 32 so as to be rotatable about the rotational axis 40. The shaft 62 can be driven in both directions of rotation by means of a drive motor 64 in the form of an electric motor. The electric motor is arranged coaxially relative to the shaft 62, at one end thereof. At the other end, three stud holders 38A, 38B, 38C are fixed to the shaft, distributed over the circumference. The component holders are each realized as cylindrical collets, which are provided with one or more longitudinal slots 66. Further, the thereby constituted collet elements can be held by a retaining ring 68 (for example, of metal or in the form of an O-ring), or be realized with radially elastic deformability in the radial direction (in relation to the feed direction).

The joining head arrangement 20 further has a first feed device 42A and a second feed device 42B comprising, respectively, a first feed channel 58A and a second feed channel 58B. The feed channels 58A, 58B are so aligned to the shaft 62 that there are defined two transfer locations 60A, 60B, which are spaced apart from one another in the circumferential direction, and which are aligned, in relation to one another, at an angle that corresponds to the angular division of the component holders 38 on the shaft 62. In the present case, the angle is 120° (corresponding to 360° divided by three component holders 38). In the case of this arrangement, one of the component holders 38A is in the joining position, and holds a component 22". A second component holder 38B is in a second transfer position aligned with the second transfer location 60B. A third stud holder 38C is in a first transfer position aligned with the first transfer location 60A.

In the case of the joining head arrangement 20 of FIG. 3, components of differing types (for example, of differing shank length and/or differing flange diameter) can be fed via the two feed devices 42A, 42B. The versatility of the joining head arrangement 20 is thereby increased.

It is understood that, instead of three stud holders, it is also possible for four or more stud holders to be fastened to the shaft 62, which stud holders are preferably uniformly spaced apart from one another in the circumferential direction. Correspondingly, it is also possible for more than two feed devices 42 to be provided, which devices are then arranged according to the positions of the stud holders that are not actually in the joining position.

The shaft 62 is preferably electrically conductive. The stud holders are also each electrically conductive, such that a respective electric current, for switching on a pilot current and a welding current, can be supplied via the shaft and the stud holders. A sliding contact, or a contact arrangement that can be closed and disconnected, such that a contact is established whenever a component 22 is to be joined to a workpiece, can be provided for the purpose of transferring the electric current from the housing 30, or the slide 32, to the shaft 62.

A further joining head arrangement 20 is shown in FIG. 4. The joining head arrangement 20 has a rigid, elongate arm 70, at the end of which a housing 30 is mounted so as to be rotatable about a head rotational axis 72. Again, as in the case of the above embodiments, a slide 32 is movable on the housing 30 so as to be axially displaceable in the joining direction 36. Two stud holders 38A, 38B, spaced apart anglewise, are mounted on the slide 32 so as to be rotatable about a rotational axis 40.

In the case of this embodiment, studs are fed via a feed device 42, being so fed into the arm 70. There, the studs, or components, are stopped and made available in a transfer station 74, as shown in FIG. 4 for the component 22'. For the purpose of receiving a component, the housing 30 is firstly rotated about the head rotational axis 72, and one of the stud holders 38A, 38B is then aligned with the transfer station 74, in order to receive the component 22' (in FIG. 4, a component 22" to be joined is held at the stud holder 38A, and an already received component 22"' is held at the stud holder 38B).

In the case of this embodiment, the supply of components into the respective stud holder 38 is effected in two stages, i.e., not in an uninterrupted manner. Firstly, a component is fed into the transfer station 74. In a second stage, the component is transferred from the transfer station 74 into a respective stud holder 38. A corresponding mechanism is to be provided for this purpose. If appropriate, the transfer in the stud holder 38 can also be effected in that the stud holder 38 is aligned with the transfer station 74 and the slide 32 is then moved in order to push the respective stud holder onto the stud made available at the transfer station 74. As an alternative thereto, the stud holders 38A, 38B can also be realized as gripping devices that, in the open state, can be moved over the shank of a component 22' that is made available in the transfer station 74.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A joining head arrange for delivering a joining component, such as a weld stud, to the joining head of an operator, such as a robotic stud welder, for placing and fixing joining components onto a workpiece during a joining operation, the delivery mechanism comprising:
    a housing movable by an operator to a placement location on the workpiece;
    a slide mounted on the housing and movable, by means of a linear drive, relative to the housing in a joining direction perpendicular to the workpiece;
    at least one component holder, located on the slide and which can releasable hold a component during placement and the joining operation;
    at least one feed device for feeding components, at a transfer location, from the feed device to the component holder; and
    the component holder is rotatable, about an axis that is aligned transversely relative to the joining direction, from a transfer position, where the component is aligned at the transfer location, to a joining position aligned with the joining direction.

2. A joining head arrangement according to claim 1, wherein the transfer location is fixed relative to one of the housing and the slide.

3. A joining head arrangement according to claim 1 and further comprising a shaft rotatably mounted on the slide, and the component holder is connected to the shaft and, when a component is held in the component holder, then the component is aligned radially relative to the shaft.

4. A joining head arrangement according to claim 3, wherein the component holder is a first component holder connected to the shaft in a first radial location, and further comprising a second component holder connected to the shaft in a second radial location.

5. A joining head arrangement according to claim 4, wherein the feed device is a first feed device with a first transfer location, and further comprising a second feed device with a second transfer location.

6. A joining head arrangement according to claim 3, and further comprising a rotary drive device operable for turning the component holder, via the shaft, from the transfer position to the joining position.

7. A joining head arrangement according to claim 6, wherein the component holder is arranged at a first end of the shaft and the rotary drive device is arranged at a second end of the shaft.

8. A joining head arrangement according to claim 6, the rotary drive device including an electric motor.

9. A joining head arrangement according to claim 8, wherein the electric motor is arranged concentrically with the shaft.

10. A joining head arrangement for joining a stud onto a workpiece, the joining head arrangement comprising
    a housing;
    a linear drive located on the housing;
    a slide mounted on the housing and movable in a joining direction, one of toward and away from the workpiece, in relation to the housing by means of the linear drive;
    a component holder mounted rotatably on the slide about an axis that is aligned transversely relative to the joining direction and operable to hold the stud during a joining operation;
    a feed device for feeding the stud to the component holder, and
    the component holder is rotatable between a transfer position, where the stud is transferable from the feed device to the component holder at a transfer location, and a joining position, where the stud is joinable to the workpiece.

11. A joining head arrangement according to claim 10, wherein the transfer location is fixed in relation to one of the housing or the slide.

12. A joining head arrangement according to claim 10, and further comprising a shaft rotatably mounted on the slide, and the component holder is mounted to the shaft so a stud held therein is aligned radially relative to the shaft.

13. A joining head arrangement according to claim 12, wherein the component holder is a first component holder mounted at a first circumferential position on the shaft, and the joining head arrangement further comprises a second component holder mounted at a second circumferential position on the shaft, and the first circumferential position is angularly separated from the second circumferential position.

14. A joining head arrangement according to claim 13, wherein the feed device is a first feed device and the transfer location is a first transfer location, and the joining head arrangement further comprises a second feed device terminating at a second transfer location.

15. A joining head arrangement according to claim 12, and further comprising a drive device fixed to the slide and operable for turning the component holder from the transfer position to the joining position.

16. A joining head arrangement according to claim 15, the component holder being arranged at a first end of the shaft and the drive device arranged at a second end of the shaft.

17. A joining head arrangement according to claim 15, wherein the drive device includes an electric motor.

\* \* \* \* \*